United States Patent

Terasawa et al.

[11] Patent Number: 5,946,439
[45] Date of Patent: Aug. 31, 1999

[54] SINGLE-MODE OPTICAL FIBER

[75] Inventors: Yoshiaki Terasawa; Yosuke Yamazaki; Fumiyoshi Ohkubo; Takatoshi Kato, all of Yokohama, Japan

[73] Assignee: Sumitomo Electric Industries, Ltd., Osaka, Japan

[21] Appl. No.: 08/989,403

[22] Filed: Dec. 12, 1997

[30] Foreign Application Priority Data

Dec. 12, 1996 [JP] Japan ................................. 8-332330

[51] Int. Cl.$^6$ .................................................. G02B 6/22
[52] U.S. Cl. ......................... 385/126; 385/123; 385/127
[58] Field of Search ............................... 385/123–128

[56] References Cited

U.S. PATENT DOCUMENTS

| | | | |
|---|---|---|---|
| 4,755,022 | 7/1988 | Ohashi et al. | 385/127 |
| 5,175,785 | 12/1992 | Dabby | 385/123 |
| 5,559,921 | 9/1996 | Terasawa et al. | 385/124 |

FOREIGN PATENT DOCUMENTS 3-18161  3/1991  Japan .

OTHER PUBLICATIONS

"Relation between Macrobending Losses and Cutoff Wavelength in Dispersion–Shifted Segmented–Core Fibres", Electronic Letters, May 22, 1986, vol. 22, No. 11, pp. 574–575.

*Primary Examiner*—John D. Lee
*Assistant Examiner*—Juliana K. Kang
*Attorney, Agent, or Firm*—Pillsbury Madison & Sutro LLP

[57] ABSTRACT

This invention relates to a single-mode optical fiber having a configuration for effectively reducing bending loss. In the single-mode optical fiber, while an optical core is constituted by inner and outer cores, an optical cladding is constituted by an inner cladding in which "tailing" occurs and an outer cladding. In particular, in a cross section of the optical fiber perpendicular to the signal light guiding direction, when the surface integral values of relative refractive index difference of the optical cladding and optical core with respect to the outer cladding having an average refractive index $n_0$ are respectively S1 and S2, the optical fiber satisfies a relationship of $S1/S2 \geq 0.8$.

3 Claims, 3 Drawing Sheets

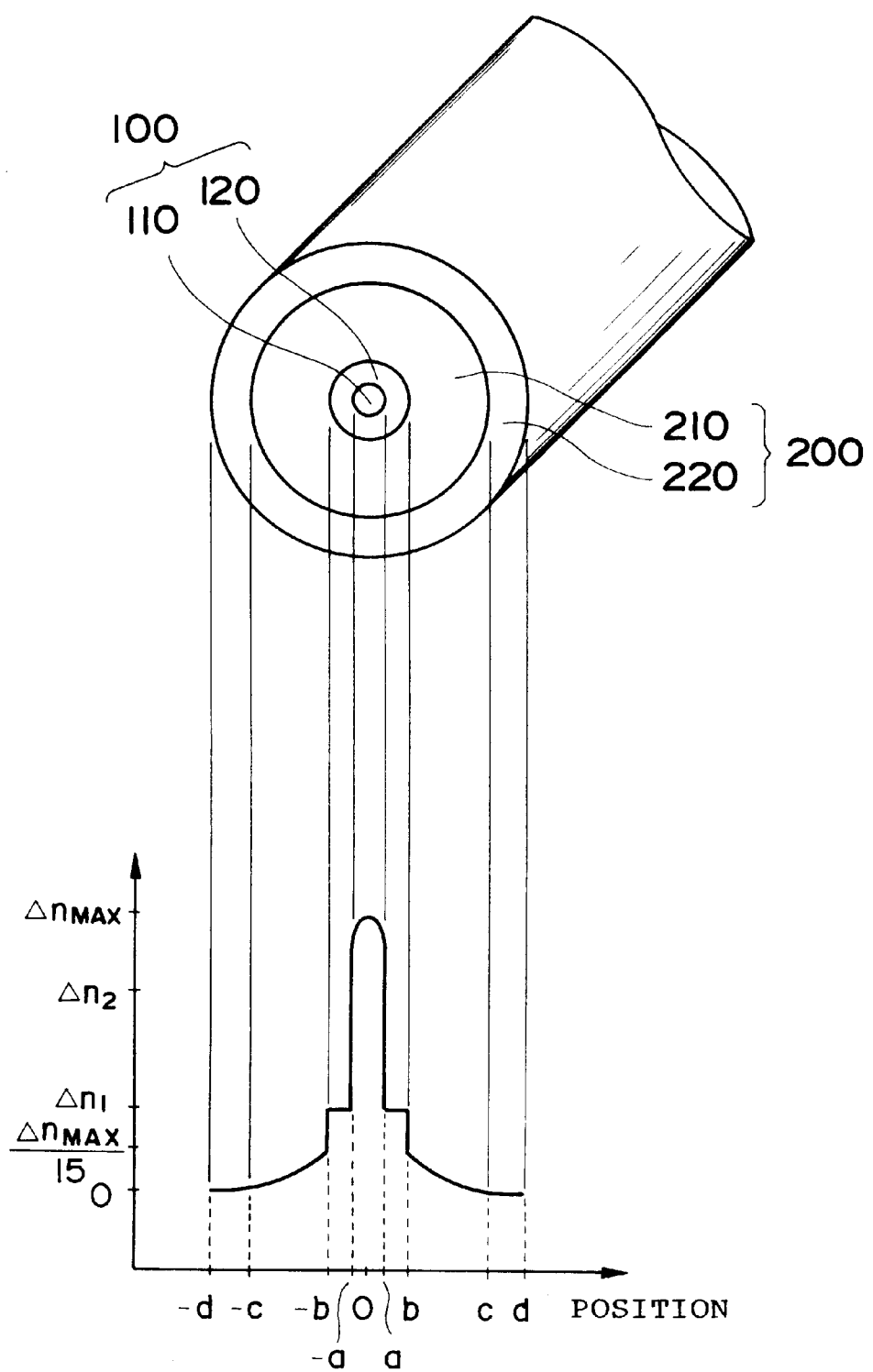

SINGLE-MODE OPTICAL FIBER

BACKGROUND OF THE INVENTION

1. Field of the Invention

The present invention relates to a single-mode optical fiber applicable to the field of optical communications.

2. Related Background Art

Conventionally, optical communication systems employing a single-mode optical fiber (hereinafter referred to as S-mode optical fiber) as their transmission line have often utilized light in the wavelength band of 1.3 μm or 1.55 μm as their signal light for communications. Recently, in order to reduce transmission loss in the transmission line, the light in the wavelength band of 1.55 μm has been in use more and more. The S-mode optical fiber employed in such a transmission line for light in the wavelength band of 1.55 μm (hereinafter referred to as 1.55-μm S-mode optical fiber) has been designed such that its wavelength dispersion (phenomenon in which pulse wave spreads due to the fact that velocity of propagation of light changes depending on its wavelength) is nullified (to yield a dispersion-shifted fiber whose zero-dispersion wavelength is 1.55 μm). For example, as such a dispersion-shifted fiber, Japanese Patent Publication No. 3-18161 discloses a dispersion-shifted fiber having a dual-shape-core type refractive index profile. Also, a dispersion-shifted fiber having a segmented-core type refractive index profile is disclosed in "Relation between Losses and Cutoff Wavelength in Dispersion-Shifted Segmented-Core Fiber," *Electronics Letter*, Vol. 22, No. 11, p. 574, 1986.

In such a conventional S-mode optical fiber having a dual-shape or segmented-core type refractive index profile, its optical core comprises an inner core occupying a center portion and having the highest average refractive index; and an outer core, disposed around the outer periphery of the inner core, having an average refractive index lower than that of the inner core and higher than that of its surrounding cladding. The inner and outer cores are in close contact with each other in the S-mode optical fiber having a dual-shape type refractive index profile, whereas they are separated from each other in the S-mode optical fiber having a segmented-core type refractive index profile.

Formed around the optical core constituted by the inner and outer cores is a cladding having a refractive index lower than the average refractive index of the outer core.

The cladding, which is a part constituting the outermost layer of the optical fiber, is typically made of pure silica from the viewpoint of weather resistance and the like. The inner and outer cores, which ought to have an average refractive index higher than that of the cladding, are usually doped with $GeO_2$ or the like in order to enhance the refractive index.

SUMMARY OF THE INVENTION

As a result of studies concerning the conventional 1.55-μm band S-mode optical fibers (dispersion-shifted fibers), the inventors have found the following problems. Namely, in a process of making the optical fiber including a heating step, an additive such as $GeO_2$ which should be added only to the core region inevitably disperses into the cladding region, such additive may mingle into pure silica in the vicinity of the interface between the cladding and core regions. Also, in the case where fluorine is added to the cladding region, the concentration of fluorine may become uneven in the cladding region.

Here, in the refractive index profile of an optical fiber, for example, when the core region is made of pure silica with or without $GeO_2$ added thereto, while the cladding region is doped with fluorine, which is a refractive-index-lowering agent, a sufficient relative refractive index difference can be attained between the core and cladding regions. In this case, in particular, it is difficult to attain a radially uniform fluorine concentration in the optical fiber when the concentration of fluorine added to the cladding region is high. For example, when a relative refractive index difference $\Delta n_3$ ($=(n_0^2-n_3^2)/2n_0^2$) of the cladding region having a refractive index $n_3$ with respect to pure silica having a refractive index $n_0$ is to be set to −0.1% or higher, it is easy to attain a substantially uniform radial refractive index, since the amount of added fluorine is appropriate. By contrast, when the relative refractive index difference $\Delta n_3$ is to be set to −0.1% or lower, the amount of added fluorine inevitably increases, thus making it difficult to attain a uniform refractive index radially in the cladding region.

As a result, there may occur a co-called "tailing" in which refractive index gradually decreases from the core region toward the cladding region.

On the other hand, in wavelength division multiplex (WDM) transmission in which a plurality of wavelengths are transmitted as being superposed on each other in order to increase transmission speed, the total power of signal light becomes high. Accordingly, in order to restrain non-linear optical phenomena from enhancing, mode field diameter (MFD) is set larger, so as to reduce power density. While optical fibers having an MFD of 8.0 μm or greater have recently been noticed from the viewpoint of power density reduction; in general, the larger the MFD is, the greater becomes transmission loss upon bending the optical fiber (hereinafter referred to as bending loss).

Namely, in the optical fiber used for WDM transmission, there is a strong demand for reducing the bending loss.

While it is thus important to reduce the bending loss, "tailing" has been generated unintentionally. Accordingly, though "tailing" can be controlled in the process of making the optical fiber, no relationship between the bending loss and the degree of "tailing" has been known, and "tailing" has not been ameliorated.

In order to overcome the foregoing problems, it is an object of the present invention to provide a single-mode optical fiber having a configuration for effectively restraining the bending loss from increasing.

In order to achieve the above-mentioned object, the single-mode optical fiber (S-mode optical fiber) according to the present invention comprises, at least, an inner core whose average relative refractive index difference with respect to a reference material having a refractive index $n_0$ is a first value $\Delta n_2$; an outer core which is provided around an outer periphery of the inner core and whose average relative refractive index difference with respect to the reference material is a second value $\Delta n_1$; an inner cladding which is provided around an outer periphery of the outer core and whose relative refractive index difference with respect to the reference material gradually decreases along a radial direction of the fiber from an interface with the outer core; and an outer cladding which is provided around an outer periphery of the inner cladding and whose average relative refractive index difference with respect to the reference material is substantially zero. Here, the second value $\Delta n_1$ is smaller than the first value $\Delta n_2$; whereas the radius of the outer periphery of the outer core, i.e., the distance from the center of the inner core to the interface between the outer core and the inner cladding is defined, in a cross section of the S-mode optical fiber perpendicular to the signal light guiding direction, as a distance from the center of the inner core along the radial direction of the S-mode optical fiber to a part at which the relative refractive index difference with respect to the reference material is $1/15$ of a maximum relative refractive index difference value of the inner core with respect to the reference material.

In general, among the S-mode optical fibers, there are those intentionally provided with a cladding region which does not directly contribute to traveling signal light. Usually, light is propagated while spreading over the vicinity of the core region (part of the cladding region) as well. Since such spreading light in the radial direction of the fiber (direction perpendicular to the light guiding direction) exponentially decreases; in the outer peripheral portion of the cladding region, there exists an area where light is hardly propagated. Since the cladding region located at such an area is a glass region mainly used for securing a physical strength, it is also known as physical cladding or jacket layer. On the other hand, known as optical cladding is a glass region which is located inside the physical cladding and through which light is propagated. Accordingly, the S-mode optical fiber according to the present invention encompasses not only an optical fiber comprising the outer cladding as its outermost layer, which constitutes an optical cladding together with the inner cladding; but also an optical fiber further comprising a jacket layer which is disposed around the outer periphery of the outer cladding and does not contribute to propagating light.

In particular, in a cross section of the S-mode optical fiber perpendicular to a signal light guiding direction, when a surface integral value of relative refractive index difference of the inner and outer claddings (optical cladding) with respect to the reference material is S1, and a surface integral value of relative refractive index difference of the inner and outer cores (optical core) with respect to the reference material is S2, the S-mode optical fiber according to the present invention satisfies the following relationship:

$$S1/S2 = \left( \int_b^d (\Delta n(r) \cdot r) dr \right) \Big/ \left( \int_0^b (\Delta n(r) \cdot r) dr \right) \quad (1)$$
$$\geq 0.8$$

wherein r is a radial distance from the center of the inner core;

$\Delta n(r)$ is a relative refractive index difference with respect to the reference material at a part in the distance r;

b is a radius of the outer periphery of the outer core; and d is a radius of the outer periphery of the outer cladding.

In this specification, a relative refractive index difference of a part having a refractive index n with respect to a reference material having a refractive index $n_0$ is given by the following expression (2):

$$\Delta n = (n^2 - n_0^2)/(2n^2) \quad (2)$$

Also, an average value $n_{AV}$ of refractive index n in a specific region is defined as a value obtained when a surface integral value within the specific region having the refractive index n is divided by the area of this specific region; whereas an average value $\Delta n_{AV}$ of relative refractive index difference $\Delta n$ in a specific region is defined as a value obtained when a surface integral value within the specific region having the relative refractive index difference $\Delta n$ is divided by the area of this specific region.

Accordingly, in the case where a refractive index profile is symmetrical with respect to an axis passing through the center of the core, the average value $n_{AV}$ of refractive index n(r) and average value $\Delta n_{AV}$ of relative refractive index difference $\Delta n$ in a region where radial distance from the center is r, inner size (radius) is A, and outer size (radius; >A) is B, the average value $n_{AV}$ of refractive index n(r) and average value $\Delta n_{AV}$ of relative refractive index difference $\Delta n$ are respectively as follows:

$$n_{AV} = \left( \int_A^B (n(r) \cdot 2\pi r) dr \right) \Big/ (\pi B^2 - \pi A^2) \quad (3)$$
$$= \left( 2 \int_A^B (n(r) \cdot r) dr \right) \Big/ (B^2 - A^2)$$

and $$\Delta n_{AV} = \left( \int_A^B (\Delta n(r) \cdot 2\pi r) dr \right) \Big/ (\pi B^2 - \pi A^2) \quad (4)$$
$$= \left( 2 \int_A^B (\Delta n(r) \cdot r) dr \right) \Big/ (B^2 - A^2).$$

In the S-mode optical fiber according to the present invention, while the outer cladding having an average refractive index $n_0$ is used as a reference material, when, in a cross section of the S-mode optical fiber perpendicular to the light guiding direction, the surface integral value of relative refractive index difference of the optical cladding with respect to the reference material is S1, and the surface integral value of relative refractive index difference of the optical core with respect to the reference material is S2, the degree of "tailing" is evaluated according to the value (S1/S2), which is set as:

$$(S1/S2) \geq 0.8.$$

As a result of studies, the inventors have found that, as the value (S1/S2) increases, the bending loss initially enhances but decreases thereafter. Also, in combinations of various values of MFD with various values of zero-dispersion wavelength where MFD is on the order of 8.0 to 8.3 $\mu$m and the zero-dispersion wavelength is about 1,530 nm, the bending loss becomes smaller when the value (S1/S2) is at least 0.8 than in the case where there is substantially no "tailing." Therefore, in the S-mode optical fiber according to the present invention, as the value (S1/S2) is set to 0.8 or higher, in the S-mode optical fiber in which MFD is on the order of 8.0 to 8.3 $\mu$m and the zero-dispersion wavelength is about 1,530 nm, the bending loss becomes smaller than in the case where no "tailing" substantially exists.

Preferably, in the S-mode optical fiber according to the present invention, the radius b of the outer periphery of the outer core is at least 7 $\mu$m. Also, in this S-mode optical fiber, the above-mentioned value (S1/S2) is preferably at least 1.1.

As a result of studies, the inventors have found that, commonly among combinations of various values of MFD and various values of zero-dispersion wavelength, the bending loss becomes smaller when the value (S1/S2) is at least 1.1 than in the case where no "tailing" substantially exists. Therefore, in the S-mode optical fiber according to the present invention, as the above-mentioned value (S1/S2) is set to 1.1 or higher, the bending loss becomes smaller than that in the case where no "tailing" substantially exists.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1 is a view showing a cross-sectional configuration of a single-mode optical fiber according to the present invention and its refractive index profile; and FIGS. 2–5 are graphs showing dependency of bending loss ratio $R_{CL}$ (S1/S2) upon value (S1/S2), in which FIG. 2 shows measured results of S-mode optical fibers respectively having MFD values of 8.3 $\mu$m, 8.7 $\mu$m, 9.1 $\mu$m, and 9.5 $\mu$m each with a zero-dispersion wavelength of 1,530 nm;

FIG. 3 shows measured results of S-mode optical fibers respectively having MFD values of 8.3 $\mu$m, 8.7$\mu$m, 9.1$\mu$m, and 9.5 $\mu$m each with a zero-dispersion wavelength of 1,550 nm;

FIG. 4 shows measured results of S-mode optical fibers respectively having MFD values of 8.3 $\mu$m, 8.7 $\mu$m, 9.1 $\mu$m, and 9.5 $\mu$m each with a zero-dispersion wavelength of 1,570 nm; and FIG. 5 shows measured results of S-mode optical fibers respectively having MFD values of 8.3 $\mu$m, 8.7 $\mu$m, 9.1 $\mu$m, and 9.5 $\mu$m each with a zero-dispersion wavelength of 1,590 nm.

DETAILED DESCRIPTION OF THE PREFERRED EMBODIMENTS

Figure 3:
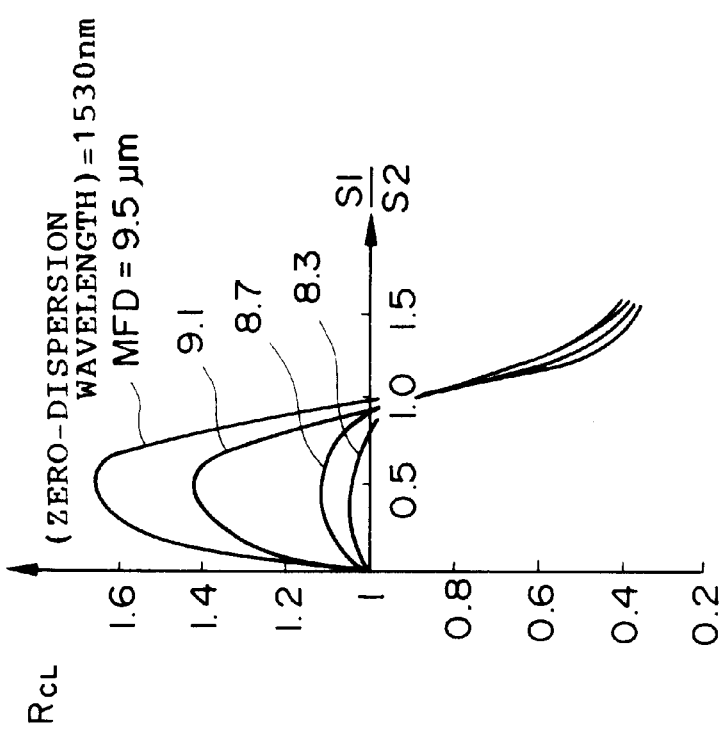

In the following, embodiments of a single-mode optical fiber (S-mode optical fiber) according to the present invention will be explained with reference to FIGS. 1 to 5. Here, in the explanation of the drawings, elements identical to each other will be referred to with numerals or letters identical to each other without their overlapping descriptions being repeated.

FIG. 1 is a view showing a cross-sectional configuration of the S-mode optical fiber according to the present invention and its refractive index profile. As shown in FIG. 1, this S-mode optical fiber comprises, at least, an inner core 110 whose average relative refractive index difference with respect to a reference material having a refractive index $n_0$ is a value $\Delta n_2$; an outer core 120 which is disposed around an outer periphery of the inner core 110 and whose average relative refractive index difference with respect to the reference material is a value $\Delta n_1$ ($<\Delta n_2$); an inner cladding 210 which is disposed around an outer periphery of the outer core 120 and whose relative refractive index with respect to the reference material gradually decreases along a radial direction of the S-mode optical fiber from an interface with the outer core 120; and an outer cladding 220 which is disposed around an outer periphery of the inner cladding 210 and whose average relative refractive index difference with respect to the reference material is substantially zero.

The radius of the outer periphery of the inner core 110 is defined as a distance along a radial direction of the optical fiber from the center of the inner core 110 to a part at which the relative refractive index difference with respect to the reference material is $1/3$ of a maximum relative refractive index difference value $\Delta n_{max}$. The radius of the outer periphery of the outer core 120 is defined as a distance along the radial direction of the optical fiber from the center of the inner core 110 to a part at which the relative refractive index difference with respect to the reference material is $1/15$ of the maximum relative refractive index difference value $\Delta n_{max}$. Here, in this S-mode optical fiber according to the present invention, the inner core 110 and outer core 120 constitute an optical core 100 for propagating signal light having a predetermined wavelength, whereas the inner cladding 210 and the outer cladding 220 constitute an optical cladding 200.

In general, the optical cladding refers to, of a cladding region disposed around the outer periphery of a core region, a waveguide area through which light leaking from the core region is propagated, so as to be distinguished from a physical cladding (which is disposed in order to secure a physical strength of the optical fiber and is also known as jacket layer) where no light is propagated. Therefore, the S-mode optical fiber according to the present invention encompasses not only the configuration shown in this embodiment but also a configuration in which a physical cladding (jacket layer) is further disposed around the outer periphery of the outer cladding 220 constituting a part of the optical cladding.

In this embodiment, the refractive index profile of inner core 110, outer core 120, inner cladding 210, and outer cladding 220 shown along a reference line perpendicular to the light guiding direction is substantially axially symmetrical with respect to the center axis of the inner core 110. Accordingly, the inner core 110, outer core 120, inner cladding 210, and outer cladding 220 have cross sections substantially formed like concentric circles respectively having radii of a, b, c, and d (=125 $\mu$m/2) from the center of the inner core 110.

In addition, in a cross section of the S-mode optical fiber according to the present invention perpendicular to the light guiding direction, the value (S1/S2) indicating the ratio of the surface integral value S1 to the surface integral value S2 defined by expression (1) satisfies the following relationship:

$$S1/S2 \geq 1.1.$$

FIGS. 2 to 5 are graphs showing dependency of the bending loss ratio $R_{CL}$ (S1/S2) defined by:

$$R_{CL}(S1/S2) = CL(S1/S2)/CL(0)$$

upon the value (S1/S2), wherein 20-mm diameter bending loss is CL(S1/S2), in the case where "tailing" does not substantially exist, i.e., in the case of 20-mm diameter bending loss CL(0) where the value S1 is zero. Here, the 20-mm diameter bending loss refers to transmission loss of an object to be measured (optical fiber) measured in a state where the object is wound around a mandrel having a diameter of 20 mm by a predetermined number of rounds.

FIGS. 2 to 5 show relationships between measured bending loss ratio $R_{CL}$ (S1/S2) and the value (S1/S2) in a plurality of S-mode optical fibers whose zero-dispersion wavelengths are 1,530 nm, 1,550 nm, 1,570 nm, and 1,590 nm (samples with MFD values of 8.3 $\mu$m, 8.7 $\mu$m, 9.1 $\mu$m, and 9.5 $\mu$m being provided for each zero-dispersion wavelength), respectively, while the average relative refractive index difference $\Delta n_1$ in the outer core 120 with respect to the reference material (refractive index $n_0$) is set to about 0.09%, and the ratio a/b of the outside diameter 2a of the inner core 110 to the outside diameter 2b (b≧7 $\mu$m) of the outer core 120 is set to about 0.25.

Figure 2:
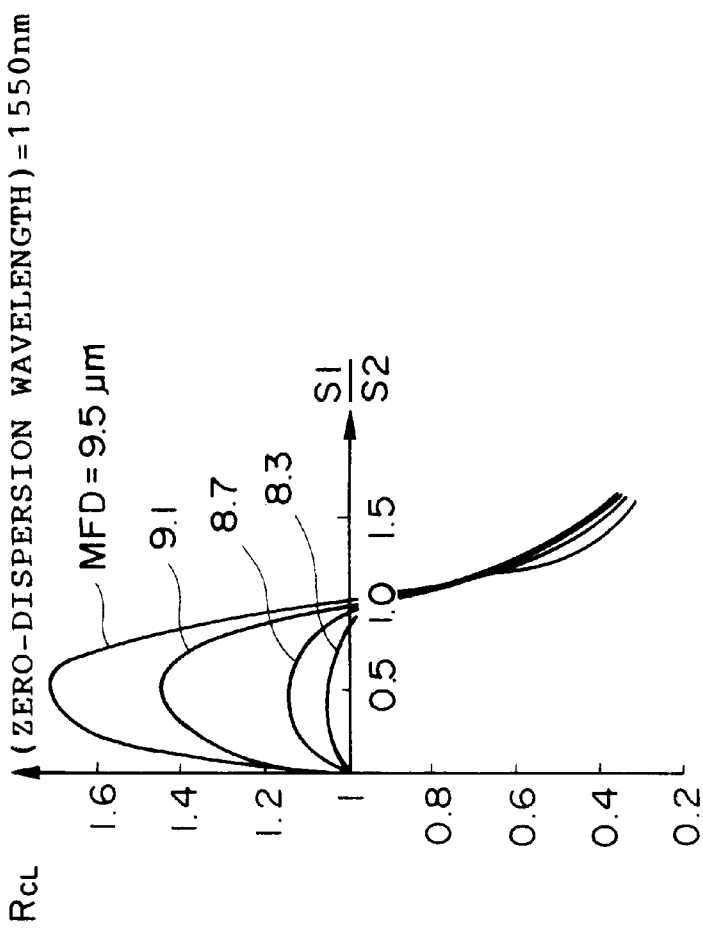
Figure 4:
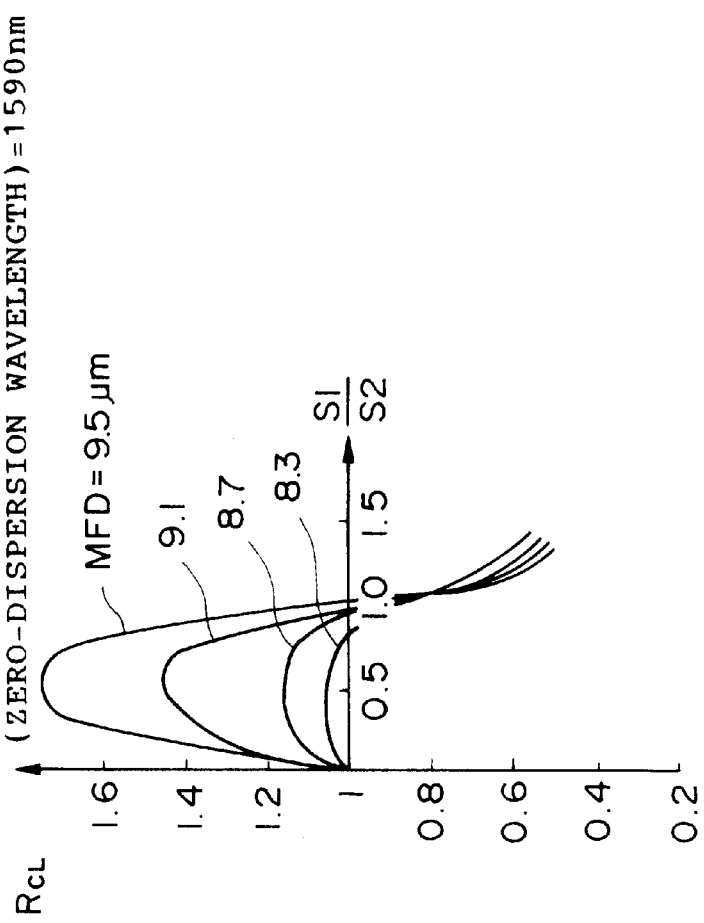
Figure 5:
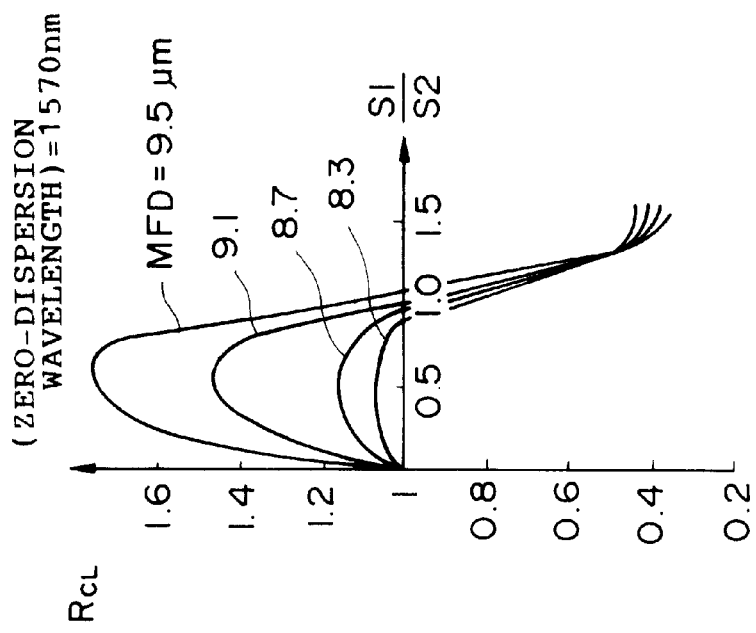

Namely, FIG. 2 shows measured results of S-mode optical fibers respectively having MFD values of 8.3 μm, 8.7 μm, 9.1 μm, and 9.5 μm each with a zero-dispersion wavelength of 1,530 nm; FIG. 3 shows measured results of S-mode optical fibers respectively having MFD values of 8.3 μm, 8.7 μm, 9.1 μm, and 9.5 μm each with a zero-dispersion wavelength of 1,550 nm; FIG. 4 shows measured results of S-mode optical fibers respectively having MFD values of 8.3 μm, 8.7 μm, 9.1 μm, and 9.5 μm each with a zero-dispersion wavelength of 1,570 nm; and FIG. 5 shows measured results of S-mode optical fibers respectively having MFD values of 8.3 μm, 8.7 μm, 9.1 μm, and 9.5 μm each with a zero-dispersion wavelength of 1,590 nm. Also, the outside diameter 2a of the inner core 110, the outside diameter 2b of the outer core 120, and the average value $\Delta n_2$ of relative refractive index difference in the inner core 110 with respect to the reference material are appropriately set so as to attain the combinations of MFD values and zero-dispersion wavelength values mentioned above.

As shown in FIGS. 2 to 5, within the range where the value (S1/S2) is 0 to 0.5, the bending loss ratio $R_{CL}$ (S1/S2) becomes higher as the value (S1/S2) increases. When the value (S1/S2) exceeds 0.5, however, the bending loss ratio $R_{CL}$(S1/S2) decreases as the value (S1/S2) increases. Then, when the value (S1/S2) is 0.8 or higher, the bending loss ratio $R_{CL}$(S1/S2) becomes smaller than 1 in the case where MFD is 8.3 μm and the zero-dispersion wavelength is 1,530 nm. Further, when the value (S1/S2) is 1.1 or higher, the bending loss ratio $R_{CL}$ (S1/S2) becomes less than 1 in all the cases.

It is due to the fact that the magnitude of bending loss at the same MFD is inversely proportional to the value of cutoff wavelength of the optical fiber, whereas the cutoff wavelength becomes longer as the effective core diameter increases. Namely, in a "tailing" state where the value (S1/S2) is 0.8 or higher, the S-mode optical fiber having an MFD of 8.3 μm and a zero-dispersion wavelength of 1,530 nm is presumed to have an effectively enhanced core diameter. Further, it is supposed that, when the value (S1/S2) is 1.1 or higher, the core diameter effectively increases in the S-mode optical fiber in all of the above-mentioned cases.

Therefore, it can be seen that, in accordance with the S-mode optical fiber of this embodiment, as the value (S1/S2) is set to 1.1 or higher, the bending loss can be lowered, thus enabling favorable optical transmission.

The present invention is not limited to the above-mentioned embodiments, and modifications can be made without departing from the present invention. For example, though the above-mentioned embodiment relates to an S-mode optical fiber having a dual-shape-core type refractive index profile, similar effects can also be obtained when an S-mode optical fiber having a segmented-core type refractive index profile is employed as the configuration disclosed in the embodiment.

Also, the outer periphery of the outer cladding 220 may further be provided with a physical cladding (jacket layer) which does not contribute to propagating signal light but is used for yielding a physical strength.

As explained in the foregoing, in the S-mode optical fiber according to the present invention, an optical core is constituted by the inner and outer cores, whereas an optical cladding is constituted by the inner cladding in which "tailing" occurs and the outer cladding. Also, when, in a cross section of the S-mode optical fiber perpendicular to the light guiding direction, the surface integral values of relative refractive index difference in the optical cladding region and optical core regions with respect to the average refractive index of the outer cladding are respectively S1 and S2, "tailing" is set such that S1/S2≧0.8. As a result, it is effective in that an S-mode optical fiber having a reduced bending loss can be obtained.

Further, the S-mode optical fiber according to the present invention is effective in that, as the above-mentioned value (S1/S2) is preferably set to 1.1 or higher, commonly among combinations of various values of MFD and various values of zero-dispersion wavelength, the bending loss can be made smaller than in the case where no "tailing" substantially exists.

From the invention thus described, it will be obvious that the implementation of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A single-mode optical fiber comprising:

an inner core whose average relative refractive index difference with respect to a reference material is a first value;

an outer core provided around an outer periphery of said inner core, said outer core constituting an optical core together with said inner core, an average relative refractive index difference of said outer core with respect to said reference material being a second value smaller than said first value, a radius of an outer periphery of said outer core being defined as a distance along a radial direction of said single-mode optical fiber from a center of said inner core to a part at which relative refractive index difference is $\frac{1}{15}$ of a maximum relative refractive index difference value of said inner core with respect to said reference material;

an inner cladding provided around the outer periphery of said outer core, a relative refractive index difference of said inner cladding with respect to said reference material gradually decreasing along said radial direction of said single-mode optical fiber from an interface with said outer core; and an outer cladding provided around an outer periphery of said inner cladding, said outer cladding constituting an optical cladding together with said inner cladding, an average relative refractive index difference of said outer cladding with respect to said reference material being substantially zero;

wherein, in a cross section of said single-mode optical fiber perpendicular to a signal light guiding direction, when a surface integral value of relative refractive index difference of said inner and outer claddings with respect to said reference material is S1, and a surface integral value of relative refractive index difference of said inner and outer cores with respect to said reference material is S2, said single-mode optical fiber satisfies the following relationship:

$$S1/S2 = \left( \int_b^d (\Delta n(r) \cdot r) dr \right) / \left( \int_0^b (\Delta n(r) \cdot r) dr \right)$$
$$\geq 0.8$$

wherein r is a radial distance from the center of said inner core;

Δn(r) is a relative refractive index difference with respect to said reference material at a part in the distance r;

b is a radius of the outer periphery of said outer core; and d is a radius of the outer periphery of said outer cladding.

2. A single-mode optical fiber according to claim 1, wherein the radius b of the outer periphery of said outer core is not less than 7 μm.

3. A single-mode optical fiber according to claim 2, wherein said (S1/S2) is not less than 1.1.

* * * * *